Jan. 21, 1958 A. MICHAUD 2,820,247
MULTIPLE PATTY FORMING MACHINE
Filed July 19, 1956 2 Sheets-Sheet 1

INVENTOR.
ABNER MICHAUD
BY
ATTORNEY

Jan. 21, 1958  A. MICHAUD  2,820,247
MULTIPLE PATTY FORMING MACHINE
Filed July 19, 1956  2 Sheets-Sheet 2

INVENTOR.
ABNER MICHAUD
BY Harry Langsam
ATTORNEY

United States Patent Office 2,820,247
Patented Jan. 21, 1958

2,820,247
MULTIPLE PATTY FORMING MACHINE
Abner Michaud, Philadelphia, Pa.
Application July 19, 1956, Serial No. 598,886
1 Claim. (Cl. 17—32)

My invention relates to a machine for forming chopped or ground foods into patties, and more particularly relates to a machine which will automatically form a plurality of patties in accurately measured quantities.

It is an object of my invention to provide a machine wherein a plurality of patties may be automatically formed from a given quantity of ground meat and laid upon a moving conveyor without being touched by hand.

Another object of my invention is to provide an improved patty forming machine which does not press out the natural meat juices.

Another object of my invention is to provide an automatic patty forming machine wherein the patties may be produced of uniform size, thickness and weight.

Another object of my invention is to provide a multiple patty forming machine which is easily disassembled and cleaned and which will provide a hygienic and sanitary handling of ground meat throughout its operation.

Other objects of my invention are to provide an improved device of the character described, that is easily and economically produced, which is sturdy in construction, and which is highly efficient in operation.

With the above and related objects in view, my invention consists in the details of construction and combination of parts, as will be more fully understood from the following description, when read in conjunction with the accompanying drawing, in which.

Figures 1, 5:
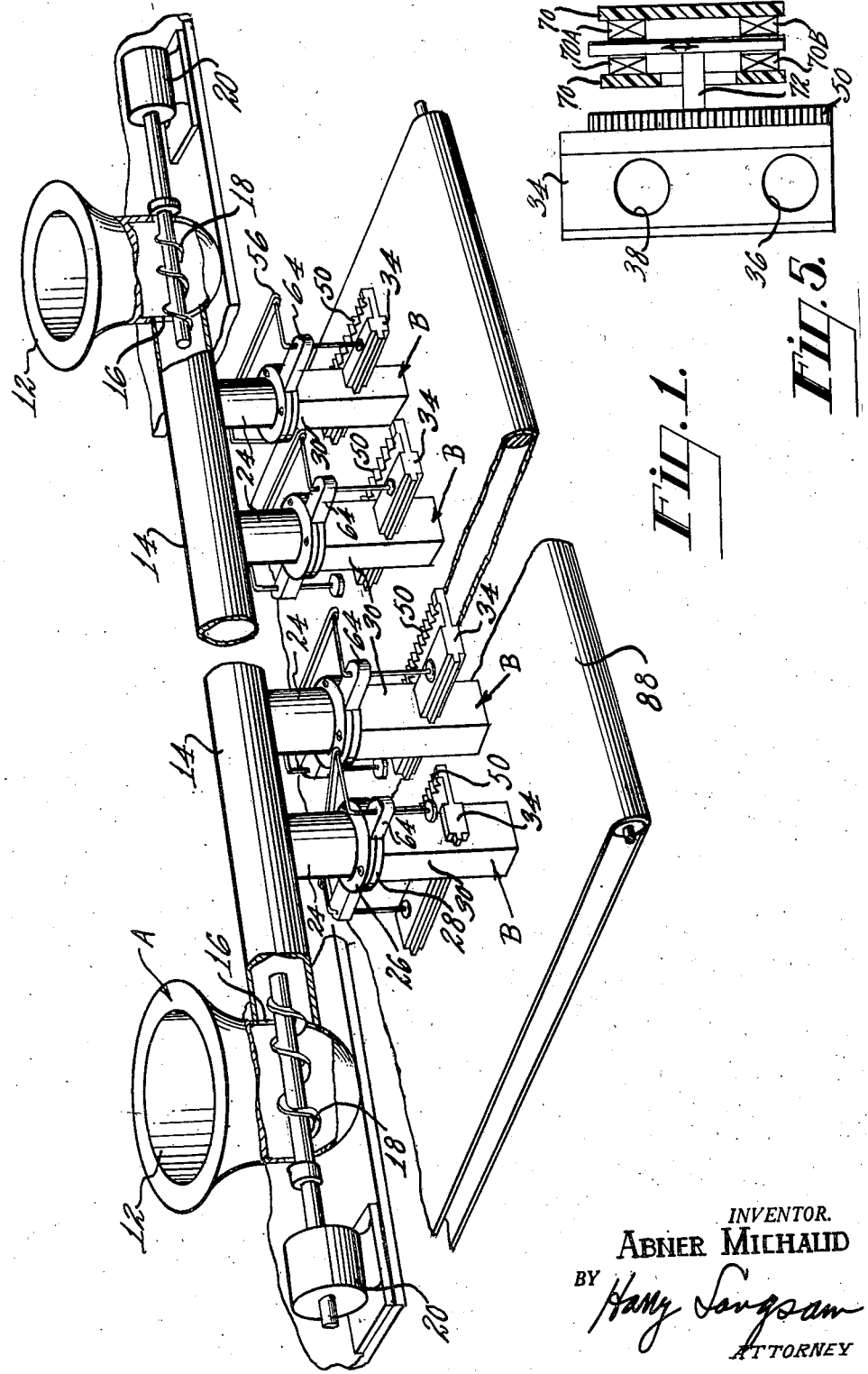
Fig. 1 is a perspective view of a multiple patty forming machine embodying my invention, the view being fragmentary with parts broken away.
Fig. 5 is a plan view of the mold drawer showing the manner of operation of the solenoid.
Figure 2:
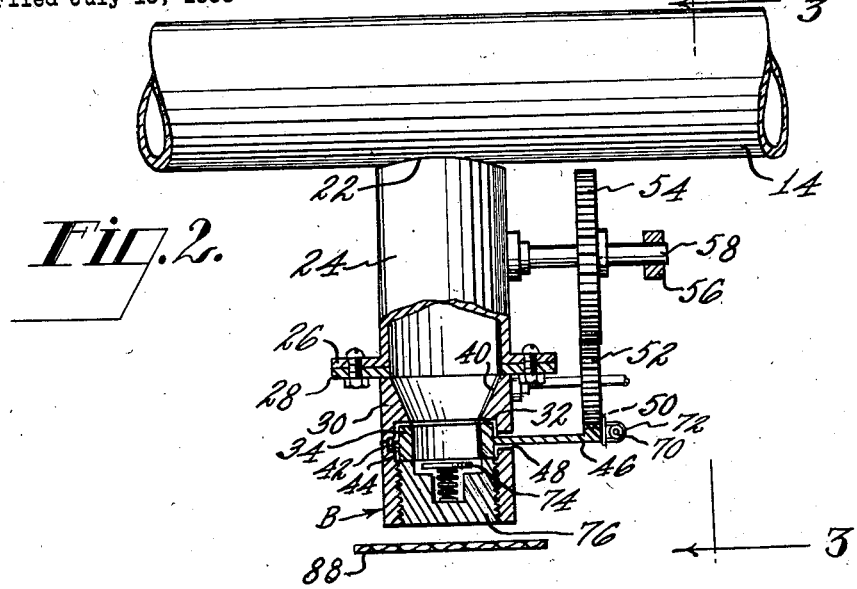
Fig. 2 is an enlarged side view partly in section, of the patty machine showing the details of the patty molding section.
Figure 3:
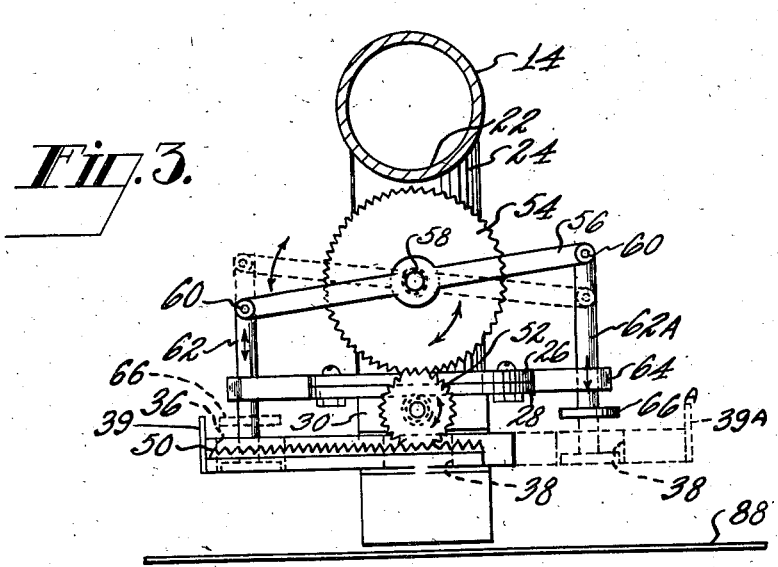
Fig. 3 is a sectional view taken along lines 3—3 of Fig. 2.

Referring now in greater detail to the drawing in which similar reference characters refer to similar parts, I show a multiple patty forming machine comprising a feeding section, generally designated as A, which forces ground plastic material such as meat into a plurality of automatic patty forming molds, generally designated as B.

The feeding section A comprises a pair of hoppers 12 of generally inverted bell shaped construction, each of which has a hollowed out inner portion adapted to contain a relatively large portion of ground meat or other plastic material. The inner portion of the two hoppers 12 are interconnected by a tubular duct 14 which is threaded into an opening 16 at the lower portion of each through which the hoppers communicate with one another. A worm drive screw 18 is rotatably supported at the bottom portion of the hopper chamber and is journaled at one end in the hopper casing, the other end of the worm feed screw 18 extending through the opening 16 whereupon a portion protrudes into the duct 14. Each of the feed worms 18 is suitably driven by a motor or gear drive unit 20 whereby any ground meat in the hoppers is forced toward the center of the duct 14 from opposite directions.

In spaced intervals at the bottom portion of the duct 14 are a plurality of apertures or slits 22 about each of which is mounted a tubular feeding tube or nipple 24 into which the ground meat is extruded downwardly under pressure. The bottom of each nipple 24 has a flange 26 upon which is bolted a corresponding flange 28 on each of the patty forming molds B.

Each mold B comprises a rectangular casing 30 having a transverse slot 32 extending therethrough in which a mold drawer 34 is adapted to slide. The mold drawer 34 has a pair of circular apertures 36 and 38 spaced from each other and passing entirely through the drawer. Each aperture serves as a mold to form the patty when it is positioned directly under a funnel-like opening 40 in the casing 30 and communicates longitudinally with the feeding tube 24. One side of the drawer 34 has a rail 42 extending along its edge which interfits with a track 44 on one side of the slot 32. The opposite side of the drawer 34 has a projection 46 which extends the length of the drawer and passes entirely through a notch 48 on the opposite side of the slot 32. The notch 48 also serves as a trackway upon which the drawer 44 may ride.

At the upper edge of the projection 46 and external to the casing 30 is milled a rack 50 which is intermeshed with a pinion gear 52 trunnioned in the casing at its side thereof. This pinion gear 52 engages a second gear 54 positioned immediately above and journaled at the side of the feeding tube 24. A lever 56 is pinned to the shaft 58 of the second gear 54 whereby transverse motion of the drawer 34 will cause the lever 56 to rock. The free ends of the lever 56 has an arm 60 pivotally mounted therein respectively at right angles to the side face thereof. The opposite end of each arm 60 is pivotally mounted to a vertically slidable presser foot 62 and 62A respectively, and each presser foot 62 and 62A is supported in a bearing 6A. Thus, as the drawer 34 is pulled in one direction so as to expose its circular mold opening 36, the lever 56 will dip so as to urge presser foot 62 downwardly whereupon ejector 66 will pass into the opening 36 and press out any patty contained therein. Conversely, as the drawer 34 is slid out so as to expose aperture 38, presser foot 62A will dip so as to depress ejector 66A and discharge any patty in aperture mold 38. It is to be observed that stops 39 and 39A are provided on the drawer and the gearing is so arranged that the presser feet 62 and 62A will alternately and freely pass into the respective openings 36 and 38 as the drawer is slidably propelled from one side to the other.

Figure 4:
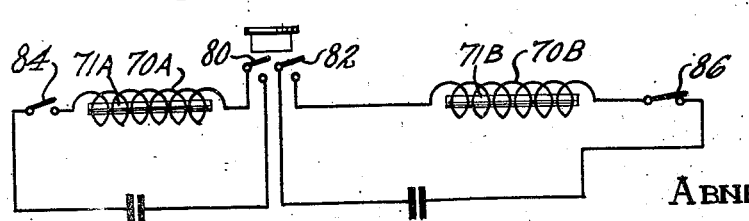
Fig. 4 is a schematic diagram of the solenoid actuating circuit.

Automatic motion of the mold drawer 34 from one side to the other is effected by a double action solenoid 70 having coils 70A and 70B, the cores 71A and 71B respectively of the solenoid being secured by a bracket 72 affixed to the side of the drawer. Operation of each solenoid coil is procured by a spring loaded pan 74 which is mounted within a plug 76 threaded within the bottom of the casing 30. The pan 74 is set below the mold apertures so that when one aperture is full, the pressure of the ground meat upon the pan will cause it to be urged downwardly until it trips contactors 80 and 82 in the solenoid circuit. See Fig. 4. In this regard it is to be observed that a trip contactor 84 is normally closed in the left pulling coil circuit 70A, and a similar contactor 86 is normally closed in the right pulling solenoid coil circuit 70B. Each of these contactors 84 and 86 will be forced open respectively as presser feet 62 and 62A are at the bottom of their stroke.

It is therefore easily seen that as the ground meat is forced from the feeding section A into each of the individual molding sections B, the pressure pan 74 will be urged downwardly to trip contactors 80 and 82 when the mold aperture 36 or 38 communicating with the feed tube 24 is full. Only one solenoid coil will be energized since the trip contactor in the second coil circuit will be open because of the position of the presser foot 62. For example, when the mold opening 38 is below the feed tube, mold opening 36 will extend beyond the casing 30 and presser foot 62 will be down. As the mold aperture 38 is filled, pressure pan 74 will close the solenoid coil 70B thereby driving the mold drawer 34 to the right. Presser foot 62A will come down because of the gear train engaged upon the rack 50 and cause the meat patty to be ejected upon a conveyor belt 88. When foot 62A is down, coil 70B is deenergized and aperture 36 now communicates with the feed tube. In this manner, the drawer 34 in each of the mold sections B will reciprocate within their respective slots and automatically deposit a meat patty from each side as a respective mold is filled.

Although my invention has been described in considerable detail, such description is intended as being illustrative rather than limiting, since the invention may be variously embodied, and the scope of the invention is to be determined as claimed.

I claim as my invention:

A multiple patty forming machine comprising a hopper, a horizontally disposed tubular duct communicating with said hopper, screw means rotatably supported in said hopper and partially extending into said duct whereby ground meat fed into said hopper will be extruded into said duct, a casing downwardly extending from said duct and in communication with the interior thereof, a mold drawer slidable within said casing, said mold drawer having a pair of axially spaced mold openings therein, one opening alternately in said drawer being adapted to communicate with the interior of said casing while the second opening extends externally thereto, a geared rack on said drawer at the side thereof, a pinion gear in intermeshing engagement with said rack, a second gear rotatably supported above said pinion gear and in intermeshing engagement therewith, a centrally pivoted rocking lever rotatable with said second gear, a vertically reciprocated ejector pivotally mounted upon each end of said rocking lever, the downward stroke of each of said ejectors being synchronized with the respective mold opening external to the casing, and solenoid means automatically reciprocating said drawer in said casing as each mold opening is filled with ground meat whereby a patty will be discharged alternately from each of the mold openings on either side of said casing.

References Cited in the file of this patent

UNITED STATES PATENTS

| | | |
|---|---|---|
| 346,470 | Elliott | Aug. 3, 1886 |
| 1,413,995 | Salerno | Apr. 25, 1922 |
| 1,831,779 | MacDonald | Nov. 10, 1931 |
| 1,881,171 | Cooley | Oct. 4, 1932 |
| 2,413,046 | Holly | Dec. 24, 1946 |
| 2,611,327 | Rudolph | Sept. 23, 1952 |